June 21, 1927.

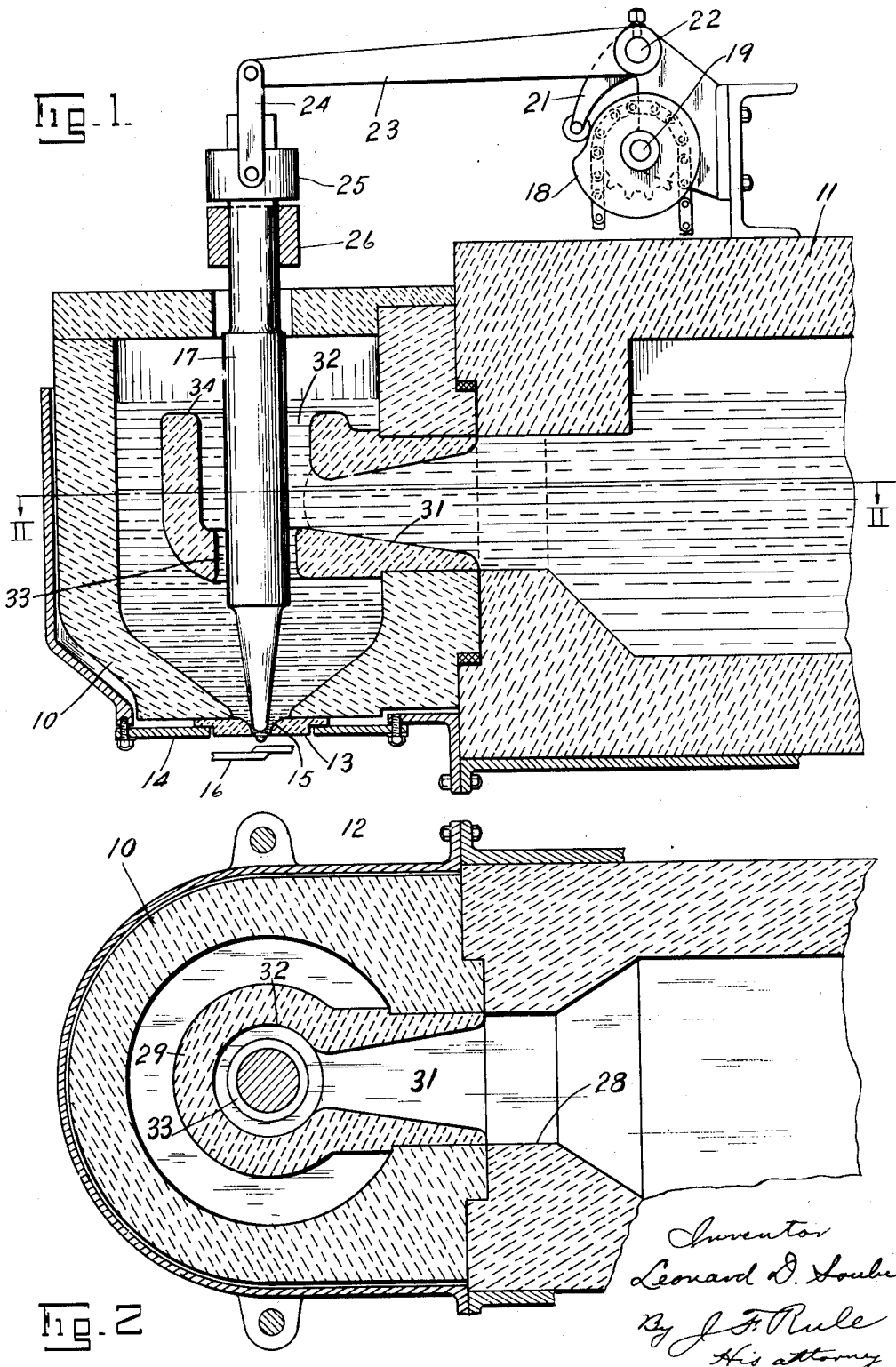

L. D. SOUBIER 1,633,044

APPARATUS FOR FEEDING MOLTEN GLASS

Filed April 14, 1924      2 Sheets-Sheet 2

Inventor
Leonard D. Soubier
By J. F. Rule
His attorney.

Patented June 21, 1927.

1,633,044

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

APPARATUS FOR FEEDING MOLTEN GLASS.

Application filed April 14, 1924. Serial No. 706,318.

My invention relates to apparatus for delivering charges of molten glass and more particularly to the type of glass feeder in which the glass is discharged through an outlet in the bottom of a container, the flow of glass being controlled by a plug or regulating member projecting downward into the glass over the outlet and periodically reciprocated vertically.

An object of my invention is to provide improved means for directing the glass in its passage to the outlet and obtaining a substantially uniform flow on all sides of the regulating plug, thereby avoiding cold streaks or a one-sided chilling of the issuing glass, and preventing stagnation of the glass in the charger.

Other objects of the invention will appear hereinafter.

In the accompanying drawings:

Figure 1 is a sectional side elevation of an apparatus constructed in accordance with my invention, the plunger being shown in its lowered position.

Figure 2 is a sectional plan view of the same at the plane of the line II—II on Figure 1.

Figure 3:
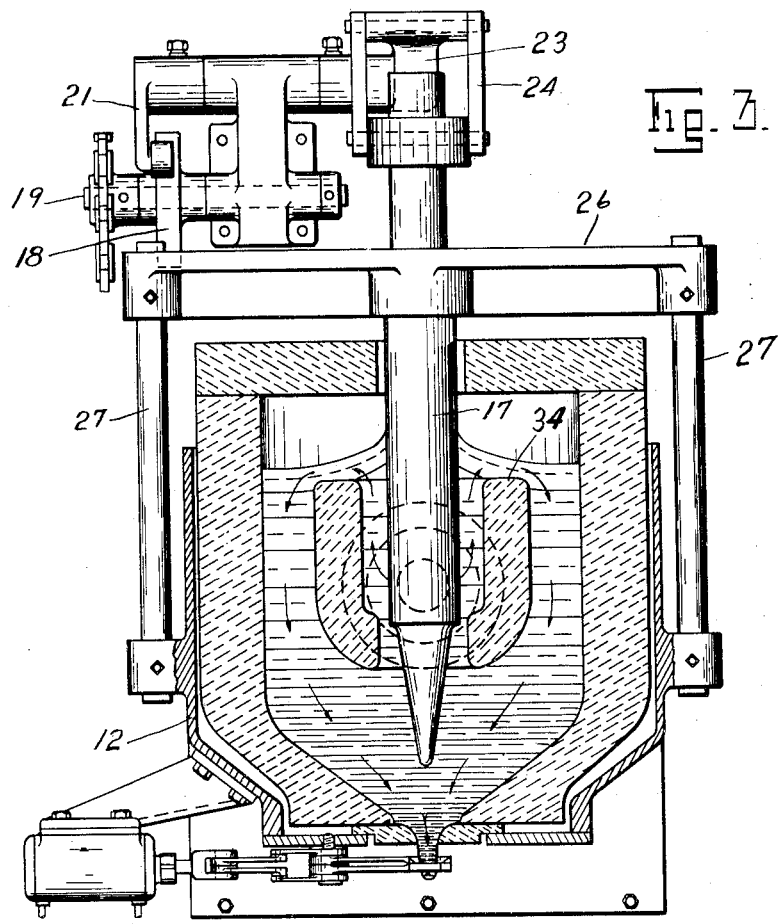
Figure 3 is a sectional front elevation, the plunger being in its elevated position.
Figure 4:
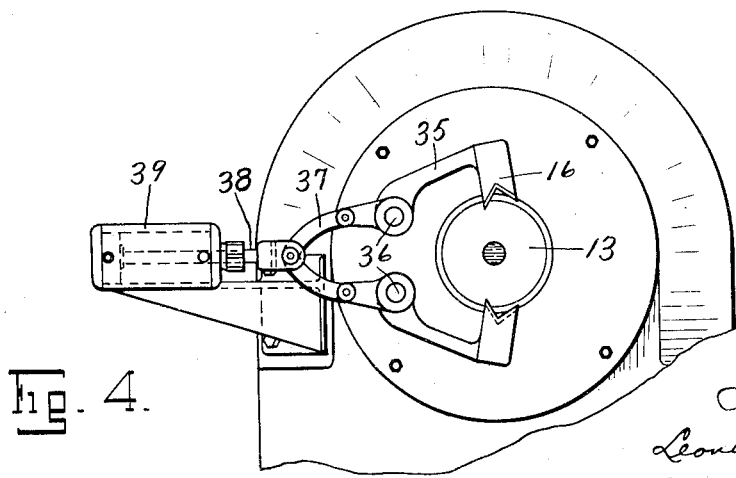
Figure 4 is a bottom plan view.

The molten glass is supplied to a charger or receptacle 10 which, as shown, may be connected to or form an extension of a furnace tank 11 from which molten glass is continuously supplied to the charger. The latter is supported in a metal frame 12. A clay bushing 13 removably held in position by a supporting plate 14, provides an outlet opening 15 at the bottom of the container, through which opening the glass issues. Shears 16 operate periodically to sever the charges of glass suspended from the walls of the outlet.

The flow of glass is controlled by a regulating plunger or plug 17, which may be periodically reciprocated by any usual or approved mechanism. As herein shown, the movements of the plunger are effected by means of a cam 18 on a continuously rotating drive shaft 19. The cam operates through a rock arm 21 on a rock shaft 22 to which is also secured a forwardly extending rock arm 23 connected through links 24 to a collar 25 on the stem of the plunger, the latter being guided in a stationary yoke 26 supported on standards 27 rising from the frame 12.

The glass flows from the furnace through a passageway 28 into the charger 10. The path of flow of glass into and through the charger is controlled by a directing member or spout 29 having a channel 31 leading from the passageway 28 to the plunger. The channel 31 opens into a chamber 32 providing an annular space or passageway surrounding the plunger. The plunger extends through a restricted opening 33 in the floor of the chamber 32, the opening being of a size to permit the plunger to move up and down freely, but permitting the passage of only a small amount of glass. The passageway 28 and the member 29 are located below the normal level of the glass, the upper edge or rim 34 of the member 29 being a short distance below the surface of the glass in the charger.

The glass flowing into the charger must enter through the channel 31, and moves upward through the annular passageway 32, except the small portion which moves downward through the restricted passageway 33. The glass flowing into the chamber 32 is distributed around the plunger, so that there is a substantially uniform flow of glass over the rim 34 and downward on all sides of the plunger to the outlet 15. A one-sided flow of glass through the outlet opening is thus prevented. Chilling or stagnation of the glass at the front side of the plunger is avoided and homogeneity and uniformity of temperature of the issuing glass is obtained. It will also be noted that the glass entering the charger is drawn from the furnace at a point below the level of the glass, thereby securing the glass in better condition and at a more uniform temperature than with the usual arrangements in which the surface glass flows into the charger.

The shear blades 16, as shown, are carried on rock arms 35 fulcrumed on pivot pins 36 and connected through links 37 to a piston 38 of an air motor 39, which is periodically operated in timed relation to the operations of the cam 18.

Modifications may be resorted to within the spirit and scope of my invention.

What I claim is:

1. In apparatus for delivering charges of molten glass, the combination of a container for the glass having an outlet opening in its bottom, a regulating member projecting downward into the glass over the outlet and controlling the discharge, said container having an inlet opening below the normal level of the glass, means for supplying glass to the container through the inlet opening, a distributing device immersed in the glass in the container and surrounding a portion of the regulating member, and a closed passageway providing direct communication between the inlet opening and the interior of said distributing device through one side of the latter.

2. In apparatus for delivering charges of molten glass, the combination of a container for the glass having an outlet opening in its bottom, a regulating member projecting downward into the glass over the outlet and controlling the discharge, said container having an inlet opening below the normal level of the glass, means for supplying glass to the container through the inlet opening, and means to distribute the entering glass around the regulating member and then cause the distributed glass to move outwardly away from the regulating member before it reaches the said outlet opening.

3. In apparatus for delivering charges of molten glass, the combination of a container for the glass having an outlet opening in its bottom, a regulating member projecting downward into the glass over the outlet and controlling the discharge, and means to distribute the glass around the regulating member and cause the glass surrounding said member to flow upward, and thence outward from said member and downward to the outlet opening.

4. In apparatus for delivering charges of molten glass, the combination of a container for the glass having an outlet opening in its bottom, a regulating member projecting downward into the glass over the outlet and controlling the discharge, means providing a passageway within said container surrounding the regulator, and means for directing a flow of glass into said chamber and upwardly through said passageway and thence downwardly to the outlet opening.

5. The combination of a container for molten glass having an outlet opening in the bottom thereof, a vertically reciprocating plunger projecting downward into the glass over the outlet, means providing a channel surrounding the plunger, and means to cause a flow of glass upward through said channel and thence downward to the outlet.

6. The combination of a container for molten glass provided with an outlet opening in its bottom, a plunger projecting downward into the glass over the outlet, means to move the plunger up and down, means providing a horizontally disposed wall in the container, means to maintain a continuous supply of molten glass in the container extending from said bottom upward to a level above said wall, said wall being provided with an opening through which the plunger extends, and means to direct the glass from the source of supply into the container at a level above said wall.

7. A combination of a glass furnace tank, a receptacle located externally of the tank and having a bottom outlet, a plunger in the glass over the outlet, the tank being provided with a passageway through its side wall below the level of the glass in the tank, and means within said receptacle for guiding the glass, said means providing a channel leading from said passageway and terminating in an annular chamber or passageway surrounding the plunger and open at its upper end, whereby the glass is caused to flow through said channel and upwardly around the plunger and thence downwardly externally of said chamber to the discharge outlet.

Signed at Toledo, in the county of Lucas and State of Ohio, this 10th day of April, 1924.

LEONARD D. SOUBIER.